US011030322B2

(12) United States Patent
Bagheri et al.

(10) Patent No.: US 11,030,322 B2
(45) Date of Patent: Jun. 8, 2021

(54) RECOMMENDING THE MOST RELEVANT AND URGENT VULNERABILITIES WITHIN A SECURITY MANAGEMENT SYSTEM

(71) Applicant: International Business Machines Corporation, Armonk, NY (US)

(72) Inventors: Ebrahim Bagheri, Toronto (CA); Mohammadreza Barouni Ebrahimi, San Jose, CA (US); Samaneh Bayat, Ottawa (CA); Zeinab Noorian, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 16/169,308

(22) Filed: Oct. 24, 2018

(65) Prior Publication Data

US 2020/0134188 A1 Apr. 30, 2020

(51) Int. Cl.
*G06F 21/57* (2013.01)
*G06F 21/55* (2013.01)
*G06N 5/02* (2006.01)

(52) U.S. Cl.
CPC .......... *G06F 21/577* (2013.01); *G06F 21/552* (2013.01); *G06N 5/02* (2013.01)

(58) Field of Classification Search
None
See application file for complete search history.

(56) References Cited

U.S. PATENT DOCUMENTS

| 7,308,712 | B2 | 12/2007 | Banzhof |
| 8,099,787 | B2 | 1/2012 | Vasudeva |
| 8,789,192 | B2 | 7/2014 | LaBumbard |
| 9,325,728 | B1* | 4/2016 | Kennedy ............. H04L 63/1433 |
| 9,544,327 | B1 | 1/2017 | Sharma et al. |
| 2007/0094735 | A1 | 4/2007 | Cohen et al. |
| 2016/0219070 | A1* | 7/2016 | Vasseur ................... H04L 45/22 |
| 2017/0093905 | A1* | 3/2017 | Ng ......................... G06Q 40/06 |
| 2019/0019158 | A1* | 1/2019 | Guan ................. G06Q 10/1053 |
| 2020/0012990 | A1* | 1/2020 | Bhargava ....... G06Q 10/063112 |

OTHER PUBLICATIONS

"IBM Application Security on Cloud (5725-T53)", International Business Machines Corporation, IBM United States Sales Manual, Mar. 20, 2017, 4 pages.

(Continued)

*Primary Examiner* — Benjamin E Lanier
(74) *Attorney, Agent, or Firm* — Stephen J. Walder, Jr.; Jeffrey S. LaBaw (57) ABSTRACT

Mechanisms are provided for accessing security vulnerability issue information. The mechanisms monitor security analyst interactions with security vulnerability issues via the security management system to generate analyst interaction log data, and generate one or more security analyst models corresponding to one or more security analysts by performing a machine learning operation on the analyst interaction log data. The mechanisms generate an analyst-issue model based on the one or more security vulnerability issue models and the one or more security analyst models, and generate an issue recommendation for a security analyst based on the analyst-issue model.

22 Claims, 4 Drawing Sheets

(56) References Cited

OTHER PUBLICATIONS

Bayat, Samaneh, "Implementing Risk-Based Application Security Management at Your Organization", International Business Machines Corporation, Application Security Management: IBM Security AppScan Enterprise 9.0, Mar. 31, 2014, 10 pages.

Bliss, Catherine A. et al., "An evolutionary algorithm approach to link prediction in dynamic social networks", Journal of Computational Science, vol. 5, Issue 5, Sep. 2014, 15 pages.

Han, Jiawei et al., "Frequent pattern mining: current status and future directions", Data Mining and Knowledge Discovery, vol. 15, Issue 1, Aug. 2007, pp. 55-86.

Han, Jiawei et al., "Mining Frequent Patterns without Candidate Generation: A Frequent-Pattern Tree Approach", Data Mining and Knowledge Discovery, vol. 8, Issue 1, Jan. 2004, pp. 53-87.

Lu, Linyuan et al., "Link Prediction in Complex Networks: A Survey", Physica A: Statistical Mechanics and its Application, 390(6), Oct. 2010, submitted version from arXiv:1010.0725v1 [physics.soc-ph], Oct. 4, 2010, 44 pages.

Mikolov, Tomas et al., "Distributed Representations of Words and Phrases and their Compositionality", Advances in neural information processing systems, Oct. 2013, 9 pages.

Mikolov, Tomas et al., "Efficient Estimation of Word Representations in Vector Space", International Conference on Learning Representations (ICLR), May 2-4, 2013, submitted version from arXiv:1301.3781v3 [cs.CL], Sep. 7, 2013, 12 pages.

\* cited by examiner

RECOMMENDING THE MOST RELEVANT AND URGENT VULNERABILITIES WITHIN A SECURITY MANAGEMENT SYSTEM

BACKGROUND

The present application relates generally to an improved data processing apparatus and method and more specifically to mechanisms for recommending the most relevant and urgent vulnerabilities within a security management system.

Application security testing is an important part of the software delivery process, i.e. the process of getting a software product to market. Such application security testing often encompasses the various techniques taken, and the tools employed, to improve the security of an application by finding, fixing and preventing security vulnerabilities. Different security testing techniques may be used to surface such security vulnerabilities at different stages of the software delivery process, such as at the design stage, development stage, deployment stage, upgrade stage, and maintenance stage.

There are many kinds of automated tools for identifying such security vulnerabilities in applications, with these automated tools often requiring different levels of security expertise on the part of the human operators. The results generated by such automated tools are often dependent on the types of information (source, binary, HTTP traffic, configuration, libraries, connections) provided to the tool, the quality of the analysis, and the scope of vulnerabilities covered. The various types of automated tools may generally be classified as static application security testing (SAST) tools, dynamic application security testing (DAST) tools, and interactive application security testing (IAST) tools.

Static Application Security Testing (SAST) is a technology that is frequently used as a source code analysis tool. The SAST method analyzes source code, byte code, and binaries for coding and design conditions that are indicative of security vulnerabilities prior to the launch of an application. SAST is used to strengthen the code prior to deployment and tends to produce fewer false positives. However, SAST methodologies require access to an application's source code and requires expert configuration and significant processing power.

Dynamic application security testing (DAST) technologies are designed to detect conditions indicative of a security vulnerability in an application in its running state. Most DAST solutions test only exposed interfaces, e.g., the HTTP and/or HTML interfaces of an Internet-enabled application. DAST methodologies are able to find visible vulnerabilities by feeding a URL into an automated scanner, for example. This method is highly scalable, easily integrated and quick. DAST methodology drawbacks lie in the need for expert configuration and a high possibility of false positives and negatives being generated.

Interactive Application Security Testing (IAST) is a solution that assesses applications from within using software instrumentation. This technique allows IAST methodologies to combine the strengths of both SAST and DAST methods as well as providing access to code, HTTP traffic, library information, backend connections and configuration information. Some IAST products require the application to be attacked, while others can be used during normal quality assurance testing.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions executed by the at least one processor to cause the at least one processor to implement a security management system for accessing security vulnerability issue information. The method comprises monitoring, by the security management system, security analyst interactions with security vulnerability issues via the security management system to generate analyst interaction log data, and generating, by the security management system, one or more security analyst models corresponding to one or more security analysts by performing a machine learning operation on the analyst interaction log data. Moreover, the method comprises generating, by the security management system, an analyst-issue model based on the one or more security vulnerability issue models and the one or more security analyst models, and generating, by the security management system, an issue recommendation for a security analyst based on the analyst-issue model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As mentioned previously, application security testing is an important part of the software delivery process. With application security testing, organizations must frequently scan their computing systems for security vulnerabilities using various scanning tools, such as Dynamic Analyzer scanners and Static Analyzer scanners, as discussed above. Each scan produces a large number of results, which makes it difficult for security analysts to analyze and manage security vulnerability issue findings.

Security management systems, such as IBM AppScan Enterprise and IBM Application Security on Cloud (ASoC) provide mechanisms to gather the results of various scanning tools into one central repository. This centralization assists analysts in accessing all of the security vulnerability issue findings across an application portfolio for every scan performed. This enables the security analysts the ability to prioritize the task of resolving vulnerabilities by sorting security vulnerability issue findings according to their severity. However, these mechanisms still fail in assisting the security analysts in viewing and fixing the security issues in the most productive order among thousands of security vulnerability issue findings that need to be processed.

That is, while these mechanisms are able to gather a large amount of security vulnerability issue findings data into a centralized location, they are not able to recommend to the human security analysts what security vulnerability issue findings data to view or what security vulnerabilities to resolve next. Currently, the best a security analyst can do is perform a basic sort and search on particular properties of the security vulnerability issue data. This is not sufficient given the complexity of security vulnerability issue data, and does not take user expertise into account. Moreover, without any learning from all the collected data, and users past behavior, these data collection mechanisms cannot provide an intelligent assistance to the security analysts and aid them in becoming more productive and effective in their duties.

The illustrative embodiments provide mechanisms that aid security analysts in finding security vulnerabilities that match their expertise and pose the highest security threat so that they may be addressed in the most expeditious and efficient manner. The mechanisms of the illustrative embodiments operate on a variety of information sources including similarities between different analysts and their interaction data, as well as similarities between different issues along with their severity information, in order to build a platform that prioritizes issues for the security analysts based on their expertise and criticality of the issue. The illustrative embodiments create a behavioral model of the security analysts as well as an issue similarity model which are used to generate an analyst-issue model that identifies similarities between analysts, similarities between issues, and relationships between analysts and issues. The analyst-issue model may then be used to perform predictive analysis to generate issue recommendations to analysts based on topological features of issues that the analyst is searching for. As a result, the security analysts operate more efficiently by having their skills applied to issues that match their expertise and interest, and which pose the highest severity to an organization's data processing systems.

As an overview, it is first assumed that a security vulnerability issue repository (referred to herein as the "issue repository") is maintained with security vulnerability issue data, or issue data, being compiled in the issue repository by security issue repository logic, such as by way of an IBM AppScan Enterprise or IBM Application Security on Cloud (ASoC) security management system available from International Business Machines (IBM) Corporation of Armonk, New York. The security issue repository logic operates in conjunction with scanner applications, executing on computing devices to monitor resources of the computing devices, which report issues encountered with these resources that may pose security vulnerabilities. The reported issues are collected by the security issue repository logic mechanisms into a security issue repository which may be searched, sorted according to severity, and viewed via the security issue repository logic.

A frequency pattern mining operation is performed on the collected issue data to discover associations between issues, such as the co-occurrence of the issues, issue dependencies, and the like. The frequency pattern mining operation, in one illustrative embodiment, finds all patterns of co-occurring issues and/or dependent issues that occur together in the issue repository at least a threshold number of times. There are different approaches for pattern mining that may be utilized depending on the desired implementation. Any known or later developed approach for identifying co-occurring and/or dependent issues, and/or combinations of different approaches, performed in parallel, sequentially, or any combination of parallel and sequential execution, may be used without departing from the spirit and scope of the present invention. The pattern mining process utilizing one or more of these approaches represents issues more precisely such that dependent/co-occurred issues are located in a nearby vector space. That is, based on the discovered associations between issues, an issue model is generated which maps similar issues into a nearby semantic representation space.

The mechanisms of the illustrative embodiments record histories of each of the analysts with regard to the analysts' interaction information, e.g., the action taken toward the issues (either issue just being viewed or the issue being resolved). Each of the analyst's interaction information is stored in a corresponding analyst interaction data structure of an analyst interaction database. This builds a model of each analyst which captures the analyst's interests (issues viewed) and expertise (issues resolved of fixed) in different types of issues reported by the security management system. The models of each of the analysts may be compared to determine a similarity degree of analysts.

Thus, an issue model is generated based on an analysis of the issue data collected by the security issue repository logic, and a plurality of security analyst models are generated for the security analysts that may view and resolve security issues in data processing systems of a particular organization. In response to a security analyst then searching for an issue via the security management system by specifying a feature of the issues to be viewed, selecting a particular issue via a graphical user interface output of issue information from the issue repository, or the like, a list of associated issue recommendations, comprising one or more associated issues, may be generated for the security analyst to view and/or resolve. The listing of associated issue recommendations may be generated based on a variety of criteria including issue severity, similarity between the other issues and the features of the issue searched for by the analyst, and similarity between the analyst and other analysts that have viewed/resolved similar issues.

Thus, a prioritized listing of issue recommendations may be generated where the issues in the prioritized listing of issue recommendations are those that are the most severe in terms of threat level to the operation of the data processing system and/or exposure of sensitive information outside a controlled access environment, those that are most like the security issue searched for by the analyst, and are most like issues that have been viewed/resolved by other analysts that are most similar to the current analyst. A scoring function that generates a scoring value based on these factors may be generated so as to prioritize the issues relative to one another in the prioritized listing based on the associated scores generated for these other issues. A predetermined number of highest prioritized issues may be returned to the analyst as recommendations in the prioritized listing of issue recommendations. This scoring function may be part of a link prediction strategy mechanism which incorporates the auxiliary issue data to suggest a best possible set of issues that are similar to the analyst's expertise and are critical to being resolved in a timely manner. In this way, the chances of resolving the most severe issues that the analyst has the expertise and interest to address are maximized, thereby maximizing the chances of resolving critical issues faster and more efficiently.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As outlined above, the illustrative embodiments provide a computer tool for assisting human security analysts in identifying security vulnerability issues associated with data processing systems so that they may more quickly identify the security vulnerability issues for which they have an expertise or an interest, and more quickly identify the security vulnerabilities that have a high criticality for needing to be resolved. The computer tool of the illustrative embodiments utilizes pattern discovery logic to build a security issue model identifying relationships or associations between security issues in a data processing system environment. In addition, the computer tool utilizes security analyst modeling logic to build security analyst models for various security analysts associated with an organization, where these models may then be utilized to identify similarities between security analysts and the particular security issues that they view/resolve. Moreover, the computer tool of the illustrative embodiments utilizes prediction logic to predict which security issues should be recommended to a particular security analyst for viewing/resolution based on the issues model and the analyst models. The result is that the computer tool of the illustrative embodiments improves the likelihood that a particular analyst will resolve critical issues more quickly, for which the security analyst has a particular expertise or interest, based on the predictions generated by the computer tool.

Figure 1:
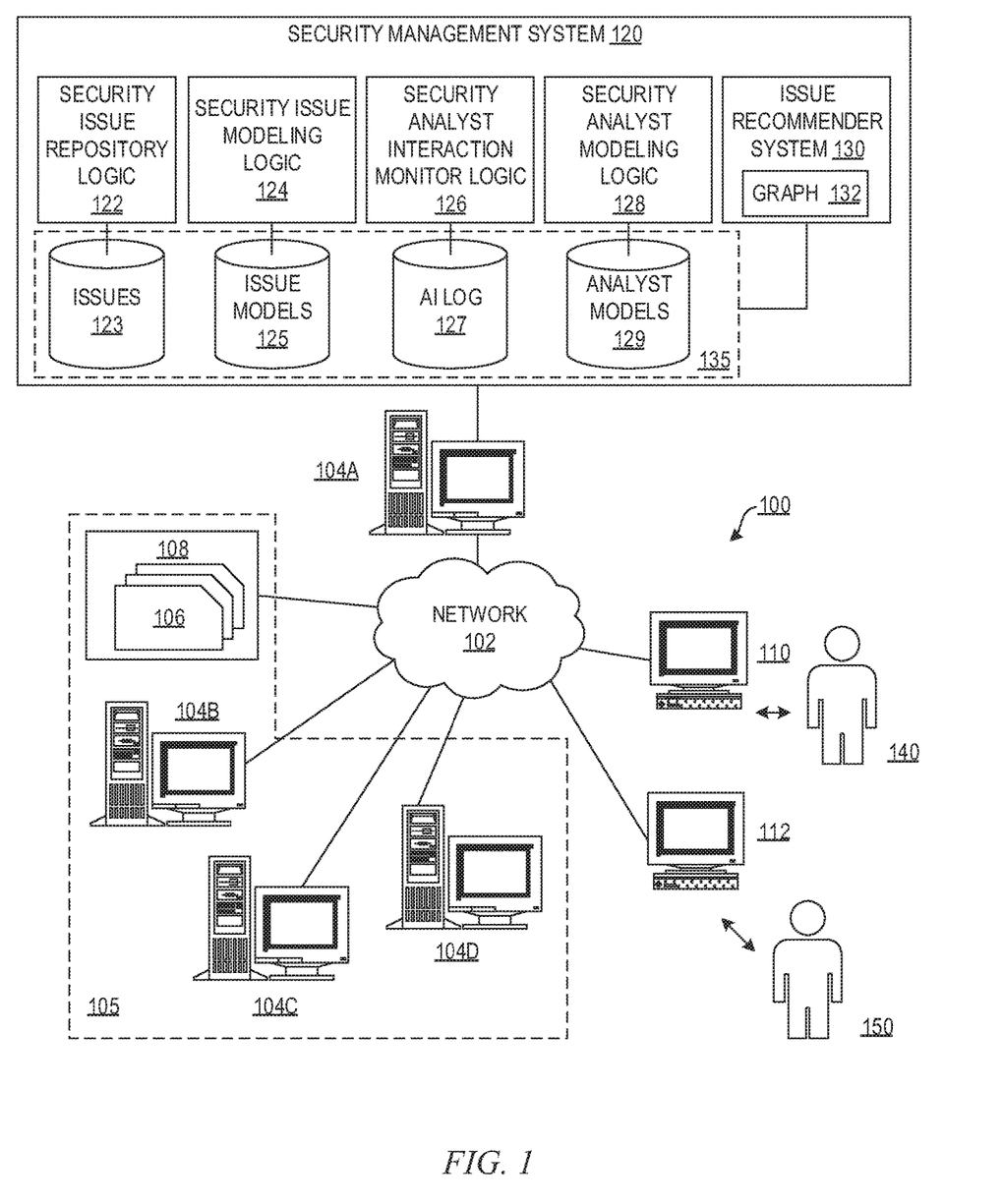
FIG. 1 is an example diagram of a distributed data processing system in which aspects of the illustrative embodiments may be implemented.
Figure 2:
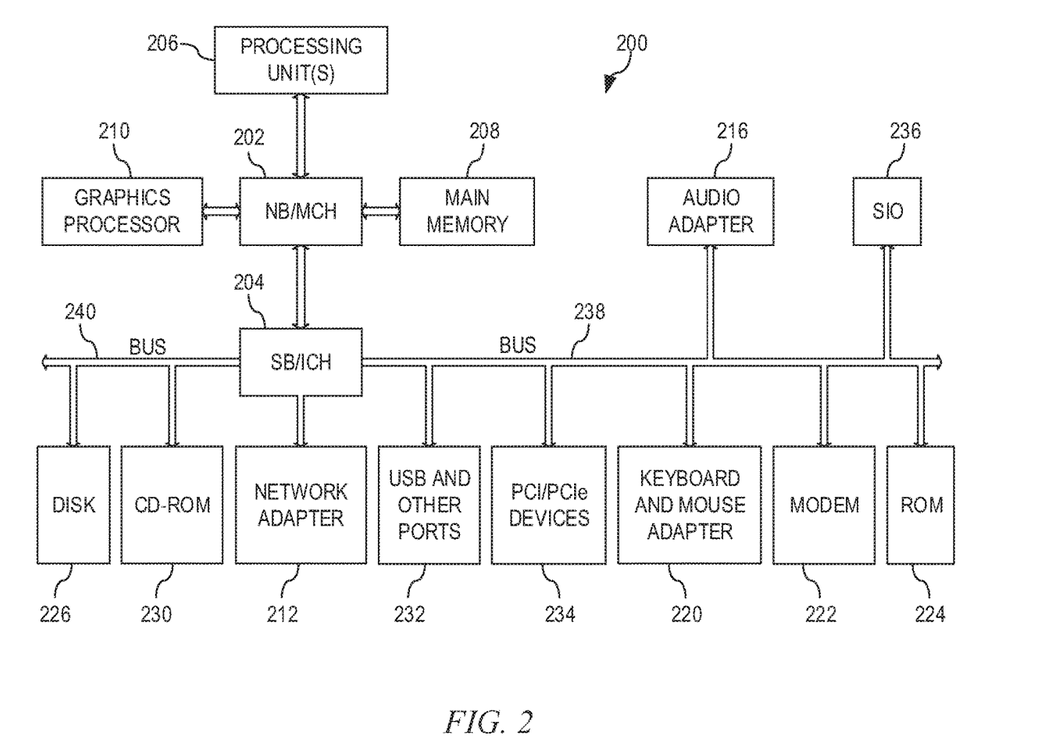
FIG. 2 is an example block diagram of a computing device in which aspects of the illustrative embodiments may be implemented.

Thus, it can be seen from the above, that the illustrative embodiments are specifically directed to a computer tool to assist human security analysts via a specifically configured data processing system or computing device implementing the mechanisms of the illustrative embodiments. The data processing system or computing device may be deployed or operate in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, fiber optic cables, or any other data communication connections, whether wired or wireless.

In the depicted example, servers 104A-104D are connected to network 102 along with storage unit 108 storing one or more data structures 106. In addition, clients 110, 112 are also connected to network 102. These clients 110, 112 may be, for example, personal computers, network computers, or the like. In the depicted example, one or more of the servers 104A-104D provide data, such as boot files, operating system images, and applications to the clients 110, 112. Clients 110, 112 are clients to one or more of the servers 104A-104D in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104A, may be specifically configured to implement a security management system 120 that itself is configured to perform security management operations on one or more physical and/or logical resources of data processing systems and/or computing devices associated with one or more organizations, such as servers 104B-104D and/or client computing devices 110, 112. The configuring of the computing device(s) may comprise the providing of application specific hardware, firmware, or the like to facilitate the performance of the operations and generation of the outputs described herein with regard to the illustrative embodiments. The configuring of the computing device(s) may also, or alternatively, comprise the providing of software applications stored in one or more storage devices and loaded into memory of the computing device(s), such as one or more of servers 104A-104D, for causing one or more hardware processors of the computing device(s) to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device(s) is/are configured in one of these ways, the computing device(s) become specialized computing device(s) specifically configured to implement the mechanisms of the illustrative embodiments and are not general purpose computing device(s). Moreover, as described hereafter, the implementation of the mechanisms of the illustrative embodiments improves the functionality of the computing device(s) and provides a useful and concrete result that facilitates the management of the resources of data processing systems and/or computing devices with regard to security vulnerabilities by providing an improved computing tool for identifying and prioritizing security vulnerability issues and presenting the prioritized listing of security vulnerabilities for review by human security analysts, where the particular prioritized listing is personalized to the particular analyst.

As shown in FIG. 1, the security management system 120 comprises security issue repository logic 122, security issue modeling logic 124, security analyst interaction monitor logic 126, security analyst modeling logic 128, issue recommender system 130, and databases 135 comprising data structures for storing corresponding data associated with issues and analysts as described hereafter. The databases 135 comprise an issues database 123 generated by the security issue repository logic 122, an issue models database 125 generated by the security issue modeling logic 124, an analyst interaction log database 127 generated by the security analyst interaction monitor logic 126, and an analyst models database 129 generated by the security analyst modeling logic 128. It should be appreciated that other logic, algorithms, and the like, may be part of the security management system 120 even though not explicitly depicted in FIG. 1, and may facilitate one or more operations of the security management system 120 described herein. For example, control logic may be provided as part of the security management system 120 and may perform control operations to orchestrate the operations of the other logic depicted in FIG. 1 as well as other fundamental operations needed to permit logic interaction capabilities. Moreover, other data structures, not explicitly shown, may be provided in the security management system 120 for facilitating the various operations, such as libraries and the like. In addition, while shown as being implemented on server 104A in FIG. 1, the mechanisms of the security management system 120 may be distributed across multiple computing devices or data processing systems, e.g., across multiple servers.

The security management system 120, in the depicted example, is configured to perform security management operations with regard to a monitored environment 105 of an organization. The monitored environment 105 comprises a plurality of computing resources, which may comprise logical resources, such as data structures, applications, and the like, and/or physical resources, such as memories, processors, storage devices, computing devices, and the like. The computing resources are generally shown in FIG. 1 as server computing devices 104B-104D and database 108, but may include any logical or physical computing resources which may be monitored for security vulnerabilities in accordance with one or more of the illustrative embodiments described herein. The computing resources may be monitored for security issues by one or more scanning algorithms that detect security issues that represent security vulnerabilities and reports these issues to the security management system 120 as security vulnerability issue data, so that they may be resolved by a security analyst. For example, in some illustrative embodiments, the computing resources monitored by the scanning algorithms may comprise web applications executing on one or more of the servers 104B-104D which provide content to one or more client computing devices via web browser applications.

The security issue repository logic 122 comprises logic for compiling security vulnerability issue data from the various computing resources of the monitored environment 105. For example, the security issue repository logic 122 may utilize or implement logic such as provided in known security management system tools which compile security issue data into a centralized location, such as IBM AppScan Enterprise, IBM Application Security on Cloud (ASoC), or the like. The collected security vulnerability issue data (also referred to herein as simply "issue data") is analyzed by the security issue modeling logic 124 to generate one or more issue models 125 identifying relationships or associations between issues.

The analysis performed by the security issue modeling logic 124 may comprise performing frequent pattern mining techniques on the collected issue data 123 to identify co-occurrences of issues and dependencies between issues. Such dependencies and co-occurrences form frequent sequential patterns. The frequent patterns allows for mining associations, correlations, and other interesting relationships among security issues from the security issue database 123. Such information may be further used by the mechanisms of the illustrative embodiments, e.g., the security issue modeling logic 124, to build a semantic representation model for issues, which may then be stored in the issue models database 125.

For example, in one illustrative embodiment, given a set of issues I from the issue repository 123, i.e. I={$i_1$, $i_2$, ..., $i_n$}, a k itemset, which consists of k issues from I, is considered to be a "frequent" item set if the k itemset occurs in the issue repository 123 no less than x times, where x is a specified minimum support threshold, and |D| is the total number of issues in D. For example, if x is set to 3, then for an issue pattern {$i_1$, $I_4$, $i_{46}$}, to be considered frequent, this combination of issues must exist at least 3 times in the issue repository 123. With the security issue modeling logic 124 applying any one or more frequent itemset mining methodologies, such as Apriori, FPgrowth, Eclat, or the like, on the issue repository 123 results in a co-occurrence model and dependency model for each issue which is stored in issue models database 125 and used by the security issue modeling logic 124 to build low-dimensional issue embeddings.

The security issue modeling logic 124 utilizes a low-dimensional security issue embedding technique that embeds security issues into real-valued, low-dimensional vector space using a neural network model applied to co-occurrence and dependency models of issues stored in the models database 125. As a result, issues with similar contexts, i.e. surrounding issues, are mapped to vectors that are nearby in the embedding space.

The security issue modeling logic 124 employs a neural network model, referred to as issue2vec, which is similar to word2vec skip-gram models but is specifically configured by the mechanisms of the illustrative embodiments to learn vector representations of issues from the issue repository 123 by using the notion of co-occurrence model as a "sentence" and the issue within the model as "words", borrowing the terminology from the natural language processing (NLP) domain. The issue2vec neural network model essentially takes a given issue and determines the probability of the each other issue in a set of issues being similar to the given issue, i.e. co-occurring or dependent on the given issue within a given context length c. In formal terms, a set S of issue logs obtained from the security issue repository logic 122, such as by the IBM ASoC mechanism implemented in the security issue repository logic 122, is obtained, where an issue log s={$I_1$, $I_2$, ..., $I_m$}, and S is defined as a sequence of issues I that co-occur with issues in s, and wherein the sequence has M issues I. Given the set S, the security issue repository logic 122 identifies a D-dimensional real-valued vector representation v for each issue I such that similar issues lie nearby in the vector space. The issue2vec model learns product representations using, for example, a skip-gram model by maximizing the objective function over the entire set S of issue logs, defined as follows:

$$\Sigma_{s \in S} \Sigma_{I_i \in s} \Sigma_{-C \leq J \leq C} \log PC(I_{i+j}|I_i) \qquad \text{Eq. 1}$$

The probability $P(I_{i+j}|I_i)$ of observing a neighboring issue $I_{i+j}$ given the current issue $I_i$ is defined using the soft-max function:

$$P(I_{i+j} | I_i) = \frac{\exp(v_{Ii}^T v'_{Ii+j})}{\sum_{l=1}^{|I|} \exp(v_{Ii}^T v'_l)} \qquad \text{Eq. 2}$$

where $v_I$ and $V_I'$ are the input and output vector representations of issue I, c is the length of the context, or context window, for issue sequences, and is the number of unique issues in the repository. The context window may be set manually and represents how many issues should be considered in sequence to determine the representation model of the current issue. From equations (1) and (2) above, it can be seen that the issue2vec models the context of the issue, where issues with similar contexts, i.e. with similar neighboring issues, will have similar vector representations. Each vector representation represents a model of the corresponding issue and thus, identifies which other issues in the set of issues are similar, e.g., a vector representation may be, in one illustrative embodiment, a 200 dimension vector in which each cell has a continuous value, i.e. not a discrete value but can take any value.

To be able to make a meaningful recommendation of the next issue to be resolved by a security analyst, the security monitoring system 120, and in particular the security analyst modeling logic 128, learns the security analysts' expertise and interest in dealing with different issues. The resulting recommendation, comprising a prioritized listing of issues, for the analyst is generated taking into consideration the security analysts' interaction log data 127 generated by the security analyst interaction monitor logic 126 from monitoring security analysts interactions with the security management system 120 for viewing and/or resolving security issues. The security analyst modeling logic 128 learns a vector representation of the analysts' interactions such that the security analysts with common interests and expertise are mapped into a similar embedding space.

That is, as security analysts interact with the security management system 120 to view and/or resolve issues reported by the scanning algorithms and whose data is collected and stored in the issues database 123, the histories of the interactions by the security analysts are recorded and maintained by the security analyst interaction monitor logic 126 in the analyst interaction (AI) log database 127. The entries in the AI log database 127 may be associated with a corresponding security analyst and may identify the particular issues and the corresponding actions taken by the security analyst, e.g., just viewing the issue, resolving or fixing the issue, or both viewing and resolving/fixing the issue.

In accordance with one illustrative embodiment, analysts may be differentiated based on two main factors, i.e. an interest set and a skill set. The interest set is generated based on an assumption that analysts will search for an issue in which they are interested. The security analyst modeling logic 128 models the security analyst's interest based on the issue with the "viewed" status in their interaction data. The skill set is generated by considering a list of issues that the security analyst actually has resolved, i.e. issues with the "resolved" or "fixed" status, where these issues are considered to be issues within the security analyst's expertise. These two factors are evaluated by the security analyst modeling logic 128, which again may comprise a neural network that learns associations of analyst activity with interests and expertise, to identify and output the vector representation of the analysts' interest and expertise.

In one illustrative embodiment, the security analyst modeling logic 128 implements a neural network referred to herein as "analyst2vec" which learns the vector representations of analysts from their interaction log data 127 compiled by the security analyst interaction monitor logic 126. The training set is derived from the analysts' set of actions, which comprises an identification of the analysts, e.g., analyst an, and their actions for different issues s (e.g., "viewed" and/or "resolved" or "fixed") ordered by the time of actions. For example, the interaction log data 127 may have entries of the type $A_n = \{s_1 a_1, s_2 a_2, \ldots, s_m a_m\}$, where $s_m a_m$ indicates that analyst $A_n$ addresses issue $s_m$ through action $a_m$.

Similar to the issue2vec neural network model discussed above, the analyst2vec neural network model learns the analyst representations using, for example, the skip-gram model by maximizing the objective function over the entire set of analysts and interaction log data 127 using equations (1) and (2) above. The output of the analyst2vec neural network model is a D-dimensional continuous representation of each analyst such that similar analysts in terms of their interest and expertise lie in a nearby vector space, i.e. similar analysts have similar vector representations or models.

Having generated vector representation models of issues and vector representations of analysts, the issue recommender system 130 operates on these vector representations to generate issue recommendations for analysts. With issue recommendation, interactions between analysts and issues are abstracted and represented in an un-bipartite weighted graph G=(V, E) 132 where the set of nodes V are composed of two sets of different classes: analysts U and issues I, (V=U ∪ I), and E is the set of edges that represent various relationships among these nodes (E⊆U×U∪U×I∪I×I). This is a formal representation of the graph and the relationship between nodes in which, given analysts U and Issues I. In this graph G, a node-pair of an analyst U and an issue I, referred to as an analyst-issue link, indicates whether an analyst has viewed or resolved (fixed) the issue. A node-pair of analysts U, referred to as an analyst-analyst link, indicates the degree of similarity between analysts. A node pair of issues I, referred to as an issue-issue link, indicates a degree of similarity between issues. To determine similarity between issues or similarity between analysts, various skip-gram model or neural network model methods for determining similarity between vectors may be utilized, for example. Moreover, in some illustrative embodiments, different similarity determination methodologies may be utilized, such as, for example, cosine similarity to evaluate similarity between two vectors. The developer may determine the value for the similarity threshold manually when building the graph and this threshold may depend on the number of similar issues and the records of analyst to determine the acceptable level of similarity to be used in graph representation.

In response to a security analyst, such as analyst 140 or 150 operating on a client computing device 110 or 112, for example, searching the issue log 123 for issues, via the security management system 120, the mechanisms of the illustrative embodiments generate recommendations for the analyst on the basis of a topological feature being searched for using the un-bipartite graph G. In some illustrative embodiments, the issue recommender system 130, having generated the graph G 132, searches the graph G 132 using a link prediction algorithm. Under the graph representation G 132, the problem of effective issue recommendation is viewed as a task of selecting unobserved links for each analyst node, which is modeled as a link prediction problem. Link prediction aims at estimating the likelihood of the existence of a link between two nodes based on the observed links and the attributes of the nodes.

There are two main categories of link prediction techniques that may be employed by the issue recommender system 130: node neighborhood based techniques and path based techniques. While both techniques are based on a predictive score function for ranking links that are likely to occur, the concept of node neighborhood techniques is to give higher scores to two nodes x and y if they have a sufficient number of common neighbors, whereas the path based technique consider the ensemble of all paths between two nodes. In one illustrative embodiment, the following metrics, which are compatible with the graph representation G context, are used to predict analyst-issue links: 1) Jaccard's Coefficient (JC) which gives higher values for a pair of nodes which share a higher amount of common neighbors relative to their total number of neighbors; and 2) Adamic/Adar metric which measures the intersection of neighbor-sets of two nodes in the graph, but emphasized smaller overlap. Both metrics identify a list of top-K issues that may be of interest to, as well as align with the expertise of, an analyst. The list of top-K issues are ranked by the issue recommender 130 based on their severity and are output to the analyst via a viewer application on the analyst workstation.

Thus, a security analyst 140 may access the security management system 120 via their client computing device 110 and network 102, in order to perform security vulnerability resolution operations regarding one or more computing resources of the monitored environment 105, e.g., a web application executing on one or more of the server computing devices 104B-104D. The security analyst 140 may access the issues database 123 and, via a graphical user interface presented to the security analyst 140 via their client computing device 110, and security issue repository logic 122 which may generate the graphical user interface for display via the client computing device 110, search for a particular issue feature or input a selection of an issue from the issues database 123. In response to the security analyst's input, the issue recommender system 130 may search the analyst-issue model, e.g., graph 132, for similar issues that are associated with the particular analyst 140 based on interest and/or expertise or are associated with similar analysts 140.

The resulting retrieved issues may then be evaluated in a ranking algorithm implemented by the issue recommender system 130 to rank the issues relative to one another based on similarity of the issues, whether the issue is related to the analyst's interest set and/or skill (expertise) set, as well as the criticality of the issues. The ranking algorithm may generate a corresponding score for the issue which may be compared to the scores of other issues to generate a relative ranking. The resulting ranked listing, or a portion of the ranked listing, may then be returned to the security analyst 140 via their client computing device 110 for viewing and/or selection of an issue for resolution.

Thus, the illustrative embodiments provide mechanisms which enable security analysts to access and resolve the most prioritized security vulnerabilities from the security management system. With these mechanism, analysts and security issues are modeled using neural networks. A recommender mechanism is provided that operates based on a link prediction approach, which incorporates semantic representations of analysts and issues when making recommendations to analysts as to the priorities of issues for the analysts to resolve. Moreover, in some illustrative embodiments, automatic implementation of solutions to these issues may be executed according to a prioritization of the issues.

As noted above, the mechanisms of the illustrative embodiments utilize specifically configured computing devices, or data processing systems, to perform the operations for performing issue recommendation that is personalized to the particular security analyst's interest and/or expertise taking into account similarities of issues. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104A in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described herein with regard to the security management system 120.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
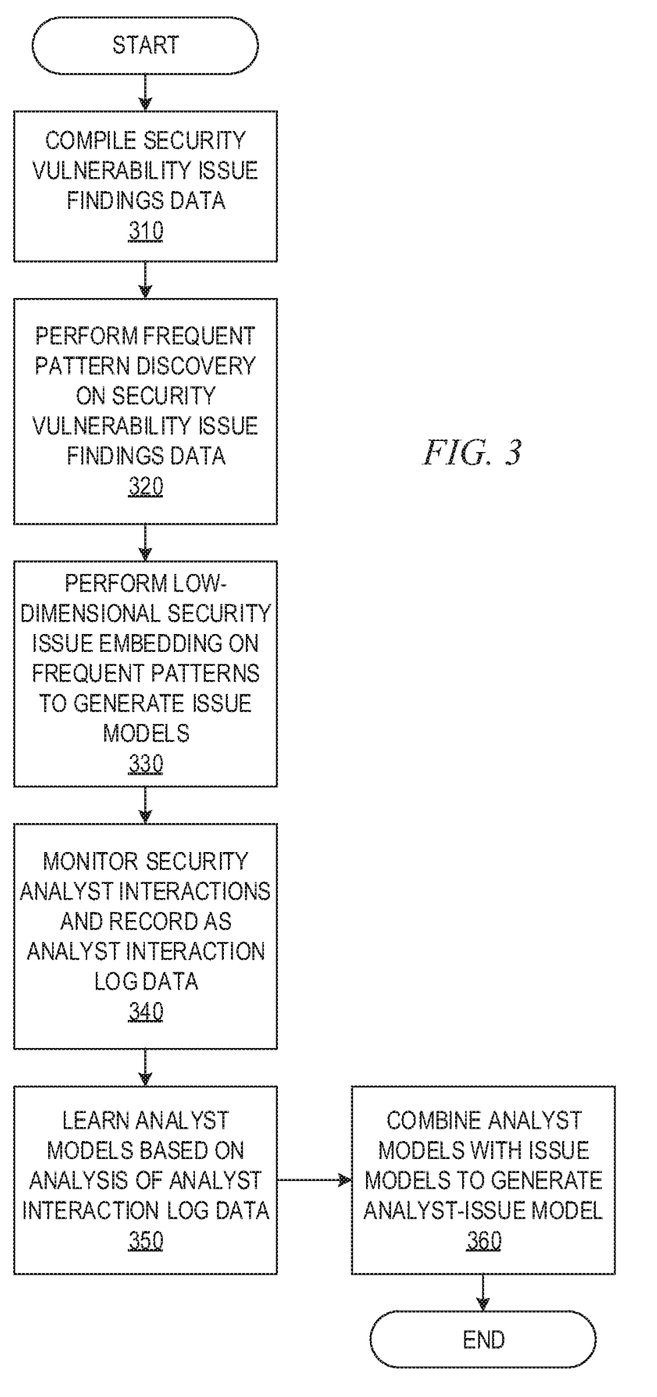
FIG. 3 is a flowchart outlining an example operation for generating an analyst-issue model in accordance with one illustrative embodiment.

FIG. 3 is a flowchart outlining an example operation for generating an analyst-issue model in accordance with one illustrative embodiment. The operation starts by compiling security vulnerability issue findings from scanning applications executing on one or more computing devices of a monitored environment (step 310). The security vulnerability issue findings are analyzed by frequent pattern discovery logic to identify frequently occurring patterns of issues in the security vulnerability issue findings (step 320). A low-dimensional security issue embedding operation is performed on the identified frequently occurring patterns of issues to generate vector representations or models of issues and which other issues in a set of issues are similar to the given issue (step 330). Security analyst interactions with the security management system are monitored and recorded as security analyst interaction logs in an analyst interaction database (step 340). The security analyst interaction logs are analyzed to learn analyst models for each security analyst to identify the interest set and skill set for each analyst and thereby generate a vector representation or model of each of the analysts (step 350). The vector representations or models of the issues and the vector representations or models of the analysts are combined to generate an analyst-issue model, such as a graph data structure representing relationships between analysts and issues (step 360). The operation then terminates.

Figure 4:
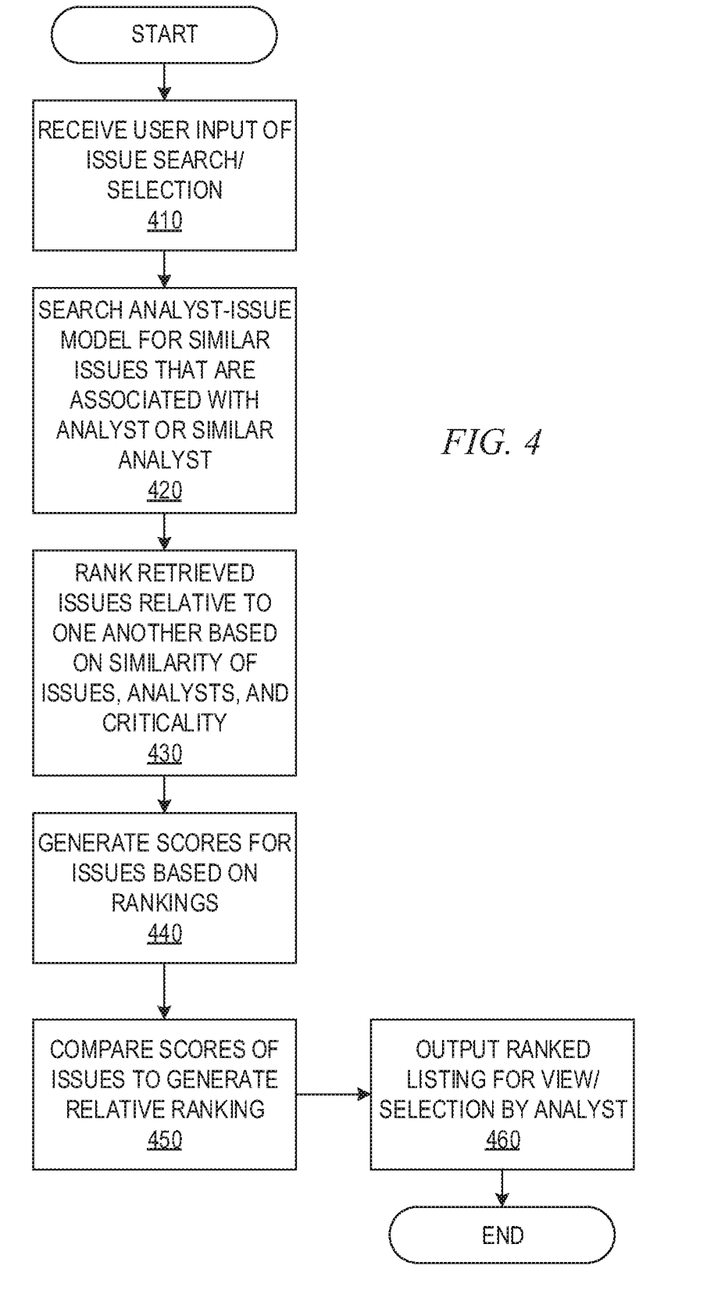
FIG. 4 is a flowchart outlining an example operation for generating issue recommendations for a security analyst in accordance with one illustrative embodiment.

FIG. 4 is a flowchart outlining an example operation for generating issue recommendations for a security analyst in accordance with one illustrative embodiment. As shown in FIG. 4, the operation starts by receiving a user input specifying an issue or feature of an issue that the user wishes to search for or select (step 410). Based on the feature of an issue or the selected issue an issue, and an identity of the analyst requesting the issue or issues, the recommender system searches the analyst-issue model for similar issues to the selected issue, or issues having the selected feature, that are associated with the particular analyst based on interest and/or expertise or are associated with similar analysts (step 420). The resulting retrieved issues are then evaluated in a ranking algorithm to rank the issues relative to one another based on similarity of the issues, whether the issue is related to the analyst's interest set and/or skill (expertise) set, as well as the criticality of the issues (step 430). The ranking algorithm generates a corresponding score for the issue (step 440) which is compared to the scores of other issues to generate a relative ranking (step 450). The resulting ranked listing, or a portion of the ranked listing, is then returned to the security analyst as issue recommendations for viewing and/or selection of an issue for resolution (step 460). The operation then terminates.

Thus, the illustrative embodiments provide mechanisms for assisting security analysts by providing a prioritized or ranked listing of security vulnerability issues that are tailored to the particular security analyst's interests and expertise. Moreover, the prioritized or ranked listing is further ranked or prioritized according to the criticality of the security vulnerability issues so that the security analyst's attention is quickly brought to the security vulnerability issues that are most critical and which are of particular interest to the security analyst or are within the expertise of that particular security analyst. The result is that the most critical security vulnerabilities are more efficiently and quickly addressed by security analysts that are most interested in and/or capable of resolving these security vulnerability issues.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions executed by the at least one processor to cause the at least one processor to implement a security management system for accessing security vulnerability issue information, the method comprising:

monitoring, by the security management system, human security analyst interactions with security vulnerability issues via the security management system to generate analyst interaction log data;

generating, by the security management system, one or more security analyst models corresponding to one or more human security analysts by performing a machine learning operation on the analyst interaction log data to configure the one or more security analyst models to map identifiers of security analyst interests and identifiers of expertise to different types of security vulnerability issues, wherein each of the one or more security analyst models comprises one or more first vector representations of issues viewed by a corresponding security analyst and issues fixed by the corresponding security analyst;

generating, by the security management system, an analyst-issue model based on a combination of one or more security vulnerability issue models and the one or more security analyst models, wherein each of the one or more security vulnerability issue models comprises one or more second vector representations of issues present in an issue repository, and wherein generating the analyst-issue model comprises generating a weighted graph based analyst-issue model, based on the one or more first vector representations and the one or more second vector representations; and outputting, by the security management system, an issue recommendation for a human security analyst based on the analyst-issue model.

2. The method of claim 1, further comprising:

compiling, by the security management system, security vulnerability issue data from one or more computing devices of a monitored computing environment; and generating, by the security management system, the one or more security vulnerability issue models by performing a machine learning operation on the compiled security vulnerability issue data.

3. The method of claim 2, wherein generating one or more security vulnerability issue models comprises performing a frequent pattern discovery operation on the security vulnerability issue data to identify co-occurring or dependent security vulnerabilities that occur at least a threshold number of times in the security vulnerability issue data.

4. The method of claim 3, wherein generating one or more security vulnerability issue models comprises performing a low-dimensional security issue embedding on frequent patterns of security issues identified by the frequent pattern discovery operation.

5. The method of claim 1, wherein monitoring human security analyst interactions with security vulnerability issues via the security management system to generate analyst interaction log data comprises, for each human security analyst in a plurality of human security analysts:

identifying first types of security vulnerability issues viewed by the human security analyst via the security management system;

identifying second types of security vulnerability issues resolved by the human security analyst via the security management system; and storing entries, corresponding to the human security analyst, in the analyst interaction log data identifying the first type of issues and second type of issues.

6. The method of claim 5, wherein generating an analyst issue model comprises, for each human security analyst in a plurality of analysts:

identifying matching security vulnerability issues in the one or more security vulnerability issue models that have types corresponding to at least one of the first types or second types of security vulnerability issues stored in the analyst interaction log data for the human security analyst; and generating, in the analyst issue model, an analyst-issue link for the identified matching security vulnerability issues.

7. The method of claim 5, wherein generating the analyst issue model comprises, for each security vulnerability issue in the security vulnerability issue models:

identifying one or more co-occurring or dependent security vulnerability issues; and generating an issue-issue link for the identified one or more co-occurring or dependent security vulnerability issues in the analyst issue model.

8. The method of claim 5, wherein generating the analyst issue model comprises, for each human security analyst in the plurality of human security analysts:

identifying one or more similar human security analysts based on similar first or second types of security vulnerability issues associated with the analysist interaction log data corresponding to the human security analysts in the plurality of human security analysts; and generating an analyst-analyst link for the identified one or more similar human security analysts in the analyst issue model.

9. The method of claim 1, wherein generating an issue recommendation for a human security analyst based on the analyst-issue model further comprises:

receiving, from a human security analyst via a client computing device, a user input specifying at least one of a feature of an issue for searching security vulnerability issues in the security vulnerability issue data or a selection of an issue from an issue listing;

searching the analyst-issue model for security vulnerability issues in the security vulnerability issue data corresponding to the feature or the selected issue and the security analyst, to thereby generate matched security vulnerability issues; and generating an issue recommendation for the human security analyst based on the matched security vulnerability issues.

10. The method of claim 9, wherein generating an issue recommendation for a human security analyst based on the matched security vulnerability issues further comprises prioritizing the matched security vulnerability issues according to criticality of the matched security vulnerability issues.

11. A computer program product comprising a computer readable storage medium having a computer readable program stored therein, wherein the computer readable program, when executed on a computing device, causes the computing device to implement a security management system for accessing security vulnerability issue information, and causes the security management system to:

monitor human security analyst interactions with security vulnerability issues via the security management system to generate analyst interaction log data;

generate one or more security analyst models corresponding to one or more human security analysts by performing a machine learning operation on the analyst interaction log data to configure the one or more security analyst models to map identifiers of security analyst interests and identifiers of expertise to different types of security vulnerability issues, wherein each of the one or more security analyst models comprises one or more first vector representations of issues viewed by a corresponding security analyst and issues fixed by the corresponding security analyst;

generate an analyst-issue model based on a combination of one or more security vulnerability issue models and the one or more security analyst models, wherein each of the one or more security vulnerability issue models comprises one or more second vector representations of issues present in an issue repository, and wherein generating the analyst-issue model comprises generating a weighted graph based analyst-issue model, based on the one or more first vector representations and the one or more second vector representations; and output an issue recommendation for a human security analyst based on the analyst-issue model.

12. The computer program product of claim 11, wherein the computer readable program further causes the security management system to:

compile security vulnerability issue data from one or more computing devices of a monitored computing environment; and generate one or more security vulnerability issue models by performing a machine learning operation on the compiled security vulnerability issue data.

13. The computer program product of claim 12, wherein the computer readable program further causes the security management system to generate one or more security vulnerability issue models at least by performing a frequent pattern discovery operation on the security vulnerability issue data to identify co-occurring or dependent security vulnerabilities that occur at least a threshold number of times in the security vulnerability issue data.

14. The computer program product of claim 13, wherein the computer readable program further causes the security management system to generate one or more security vulnerability issue models at least by performing a low-dimensional security issue embedding on frequent patterns of security issues identified by the frequent pattern discovery operation.

15. The computer program product of claim 11, wherein the computer readable program further causes the security management system to monitor security analyst interactions with security vulnerability issues via the security management system to generate analyst interaction log data at least by, for each human security analyst in a plurality of human security analysts:

identifying first types of security vulnerability issues viewed by the human security analyst via the security management system;

identifying second types of security vulnerability issues resolved by the human security analyst via the security management system; and storing entries, corresponding to the human security analyst, in the analyst interaction log data identifying the first type of issues and second type of issues.

16. The computer program product of 15, wherein the computer readable program further causes the security management system to generate an analyst issue model at least by, for each human security analyst in a plurality of analysts:

identifying matching security vulnerability issues in the one or more security vulnerability issue models that have types corresponding to at least one of the first types or second types of security vulnerability issues stored in the analyst interaction log data for the human security analyst; and generating, in the analyst issue model, an analyst-issue link for the identified matching security vulnerability issues.

17. The computer program product of claim 15, wherein the computer readable program further causes the security management system to generate the analyst issue model at least by, for each security vulnerability issue in the security vulnerability issue models:

identifying one or more co-occurring or dependent security vulnerability issues; and generating an issue-issue link for the identified one or more co-occurring or dependent security vulnerability issues in the analyst issue model.

18. The computer program product of claim 15, wherein the computer readable program further causes the security management system to generate the analyst issue model at least by, for each human security analyst in the plurality of human security analysts:

identifying one or more similar human security analysts based on similar first or second types of security vulnerability issues associated with the analysist interaction log data corresponding to the human security analysts in the plurality of human security analysts; and generating an analyst-analyst link for the identified one or more similar human security analysts in the analyst issue model.

19. The computer program product of claim 11, wherein the computer readable program further causes the security management system to output an issue recommendation for a human security analyst based on the analyst-issue model further at least by:

receiving, from a human security analyst via a client computing device, a user input specifying at least one of a feature of an issue for searching security vulnerability issues in the security vulnerability issue data or a selection of an issue from an issue listing;

searching the analyst-issue model for security vulnerability issues in the security vulnerability issue data corresponding to the feature or the selected issue and the security analyst, to thereby generate matched security vulnerability issues; and generating an issue recommendation for the human security analyst based on the matched security vulnerability issues.

20. The method of claim 19, wherein the computer readable program further causes the security management system to generate an issue recommendation for a human security analyst based on the matched security vulnerability issues at least by prioritizing the matched security vulnerability issues according to criticality of the matched security vulnerability issues.

21. An apparatus comprising:

a processor; and a memory coupled to the processor, wherein the memory comprises instructions which, when executed by the processor, cause the processor to implement a security management system for accessing security vulnerability issue information, and causes the security management system to:

monitor human security analyst interactions with security vulnerability issues via the security management system to generate analyst interaction log data;

generate one or more security analyst models corresponding to one or more human security analysts by performing a machine learning operation on the analyst interaction log data to train the one or more security analyst models to map identifiers of security analyst interests and identifiers of expertise to different types of security vulnerability issues, wherein each of the one or more security analyst models comprises one or more first vector representations of issues viewed by a corresponding security analyst and issues fixed by the corresponding security analyst;

generate an analyst-issue model based on a combination of one or more security vulnerability issue models and the one or more security analyst models, wherein each of the one or more security vulnerability issue models comprises one or more second vector representations of issues present in an issue repository, and wherein generating the analyst-issue model comprises generating a weighted graph based analyst-issue model, based on the one or more first vector representations and the one or more second vector representations; and generate an issue recommendation for a human security analyst based on the analyst-issue model.

22. The method of claim 1, wherein the analyst-issue model is an un-bipartite weighted graph comprising nodes representing one or more security analysts, nodes representing one or more issues, one or more first links between the one or more security analysts, one or more second links between the one or more issues, and one or more third links between at least one security analyst and at least one issue.

* * * * *